(12) United States Patent
Anzawa

(10) Patent No.: US 6,633,091 B1
(45) Date of Patent: *Oct. 14, 2003

(54) STORAGE MODULE

(75) Inventor: Seiichi Anzawa, Nagano (JP)

(73) Assignee: Nagano Japan Radio Co., Ltd. (JP)

( * ) Notice: Subject to any disclaimer, the term of this patent is extended or adjusted under 35 U.S.C. 154(b) by 120 days.

This patent is subject to a terminal disclaimer.

(21) Appl. No.: 09/658,064

(22) Filed: Sep. 8, 2000

(30) Foreign Application Priority Data

Sep. 8, 1999 (JP) .......................................... 11-254059

(51) Int. Cl.$^7$ ................................................ H02J 1/10
(52) U.S. Cl. ............................ 307/52; 307/77; 307/110
(58) Field of Search ........................... 307/52, 60, 77, 307/110; 320/110, 104

(56) References Cited

U.S. PATENT DOCUMENTS

| | | | |
|---|---|---|---|
| 3,986,097 A | | 10/1976 | Woods .......................... 321/2 |
| 5,119,010 A | * | 6/1992 | Shirata et al. ............... 320/110 |
| 5,594,320 A | * | 1/1997 | Pacholok et al. ........... 320/103 |
| 5,656,870 A | * | 8/1997 | Turnbull ...................... 307/109 |
| 5,710,504 A | * | 1/1998 | Pascual et al. ............. 180/65.8 |
| 5,767,660 A | * | 6/1998 | Tabata et al. ............... 320/140 |
| 5,821,729 A | | 10/1998 | Schmidt et al. ................. 320/6 |
| 6,066,936 A | * | 5/2000 | Okamura et al. ........... 320/104 |
| 6,158,537 A | * | 12/2000 | Nonobe ...................... 180/65.3 |
| 6,158,541 A | * | 12/2000 | Tabata et al. ................ 180/165 |
| 6,205,036 B1 | | 3/2001 | Anzawa ........................ 363/20 |

FOREIGN PATENT DOCUMENTS

| | | | |
|---|---|---|---|
| JP | 5-159755 | 6/1993 | |
| JP | 07322516 A | * 12/1995 | ............. H02J/7/02 |
| JP | 10-84627 | 3/1998 | |

OTHER PUBLICATIONS

Patent Abstracts of Japan, Publication No. 07–322516, Publication Date Dec. 1995, Machine translation of Japanese Patent Application from Japanese Patent Office, 7 pages.*
Patent Abstracts of Japan Publication No.: 10–084627 Publication Date Mar. 31, 1998 (2 pages).
Patent Abstracts of Japan Publication No.: 05–159755 Publication Date Jun. 25, 1993 (2 pages).
Japanese Patent Office Action dated Jan. 16, 2002 pertaining to Application No. 11–254059 (7 pages).
Japanese Patent Office Action dated Apr. 21, 2000 pertaining to Application No. 11–254059 (5 pages).

* cited by examiner

Primary Examiner—Gregory J. Toatley, Jr.
Assistant Examiner—Sharon A. Polk
(74) Attorney, Agent, or Firm—Rosenthal & Osha L.L.P.

(57) ABSTRACT

The storage module comprises a plurality of storage means Ca–Cd for storing electric energy and energy transfer means 2a–2d and Sa–Sd for transferring stored energy among the plurality of storage means Ca–Cd so that the charging voltage Vca–Vcd across each of the storage means Ca–Cd can be kept at a value according to a prescribed ratio.

6 Claims, 6 Drawing Sheets

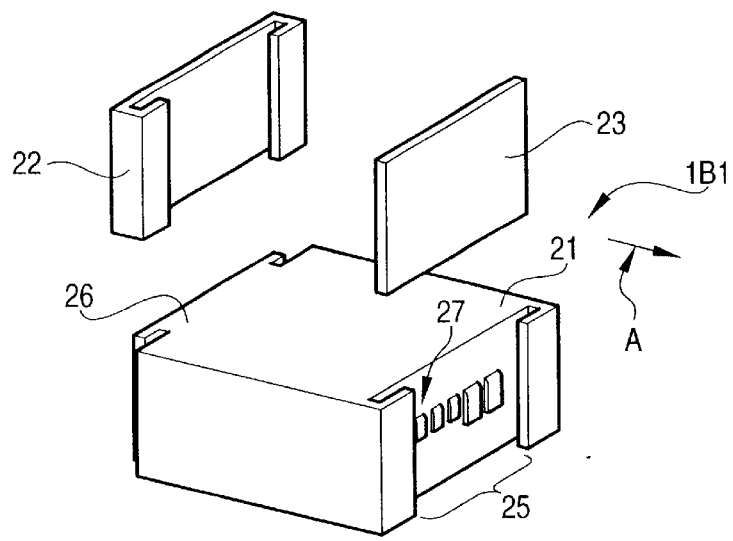
FIG. 6A
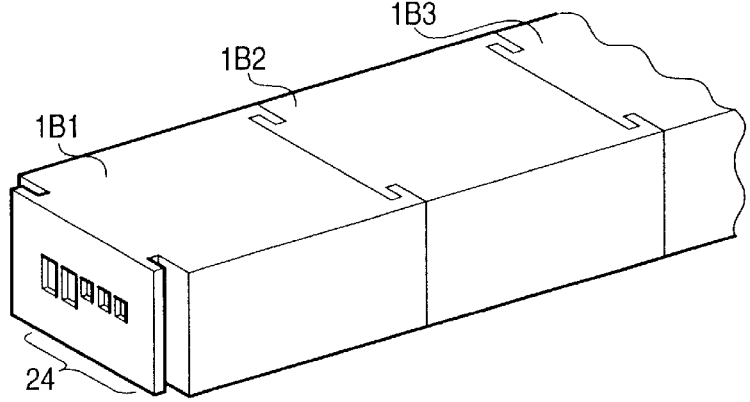
FIG. 6B
FIG. 7A
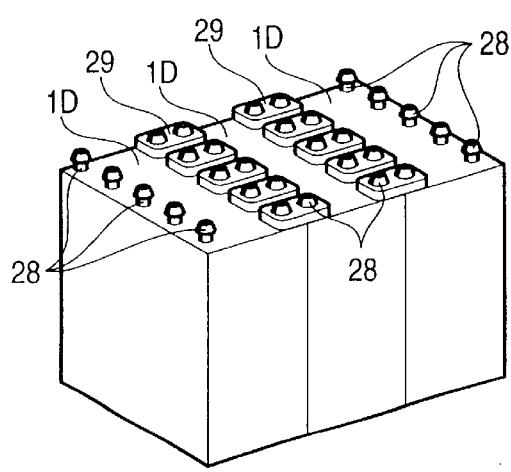
FIG. 7B
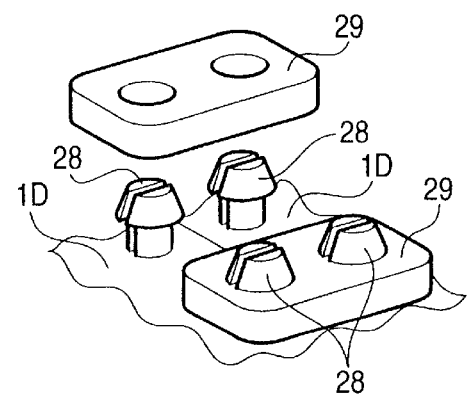

STORAGE MODULE

BACKGROUND OF THE INVENTION

1. Field of the Invention

The present invention relates to a storage module or capacitor module which incorporates a plurality of storage means and can transfer energy among the storage means.

2. Description of the Related Art

As a conventional apparatus which can transfer electric energy stored in a storage means, a transfer apparatus 31 disclosed in e.g. JP-A-7-322516 is well-known. As shown in FIG. 8, the transfer apparatus 31 is configured so that the energy stored in a plurality of capacitors C1–C4 can be averaged by transferring the energy stored in an any one of these capacitors to the other capacitors. Specifically, the transfer apparatus 31 includes a series circuit of a choke coil L1 and switch SW1 which is connected in parallel to the capacitor C1; a switch 21 connected to the capacitor C2 through the choke coil L1; a series circuit of a choke coil L2 and a switch SW22 which is connected in parallel to the capacitor C2; a series circuit of a choke coil L3 and a switch SW32 which is connected to the capacitor C3; a switch SW32 connected to the capacitor C3 through the choke coil L2; and a switch SW4 connected to the capacitor C4 through the choke coil L3.

In this transfer apparatus 31, where the energy stored in the capacitor C4 is transferred to the capacitor C1, first, the switch SW4 is turned on. In this case, as seen from FIG. 8, a current I31 flows to excite the choke coil L3. Next, the switch SW4 and switch SW31 are simultaneously turned on and off, respectively. Then, a current I32 based on the excited energy of the choke coil L3 flows to charge the capacitor C3. Further, after the switch SW31 is turned off, the switch SW32 is turned on. Then, a current I33 flows to excite the choke coil L2. Subsequently, the switch SW32 and switch SW22 are turned on and off, respectively. Then, a current I34 based on the excited energy of the choke coil L2 flows to charge the capacitor C2. Next, after the switch SW22 is turned off, the switch SW21 is turned on. Then, a current I35 flows to excite the choke coil L1. Finally, the switch SW21 and switch SW1 are simultaneously turned off. Then, a current I36 based on the excited energy of the choke coil L1 flows to charge the capacitor C1. In this way, the energy stored in the capacitor C4 is transferred to the capacitor C1.

However, the conventional transfer apparatus 31 described above presents the following problem. Namely, in the transfer apparatus 31, in order to average the stored energy in the capacitors C1–C4, the choke coils L1–L3 and switches SW1–SW4 must be connected. This is very troublesome.

Further, for example, in order to transfer the energy from the capacitor C4 to the capacitor C3, the switch SW4 and switch SW3 must be simultaneously turned off and on, respectively. In this case, if the switch SW31 is turned on prior to turn-off of the switch SW4, the capacitors C3 and C4 are short-circuited through the switches SW4 and SW31 so that the energy stored in both capacitors C3 and C4 is lost. On the other hand, if the switch SW4 is turned off prior to the turn-on of the switch SW31, a very high voltage is generated across the switch SW4 so that the switch SW3 will be damaged. Thus, the conventional transfer apparatus 31 presents a problem that if the timing of the on/off control of the switches SW1–SW4 becomes out of sync slightly, the short-circuiting or damage of the circuit component occurs, and the energy cannot be transferred.

Further, in order to transfer the energy from the capacitor C4 to the capacitor C1, the switches SW4–SW1 must be on/off controlled many times at accurate timings. Therefore, the transfer apparatus 31 also presents a problem that the control of switches is troublesome.

In addition, in the transfer apparatus 31, in order to transfer the energy among the four capacitors C1–C4, six switches SW1–SW4 must be employed. In this case, assuming that energy is transferred among a large number of capacitors, the number of the switches to be used is approximately twice as much as that of the capacitors. Therefore, the conventional transfer apparatus also presents the problem that it requires a large number of switches and hence is expensive and up-sized.

SUMMARY OF THE INVENTION

The present invention has been accomplished in order to solve the problems described above, and an object of the present invention is to provide a storage module which can transfer stored energy among a plurality of storage means without making troublesome connecting work. Another object of the present invention is to provide a storage module which can transfer stored energy reliably, surely and easily and can be made inexpensive and down-sized.

In order to attain the above object, according to a first aspect of the present invention, there is provided a storage module comprising: a plurality of storage means for storing electric energy; and energy transfer means for transferring stored energy among the plurality of storage means so that the charging voltage across each of the storage means can be kept at a value according to a prescribed ratio.

According a second aspect of the present invention, there is provided a storage module according to the first aspect, wherein the energy transfer means includes a plurality of series circuits each composed of at least a first winding and switching means connected in series, each of the plurality of series circuits is adapted to be connectable in parallel to each of the plurality of storage means, the first windings are magnetically coupled with one another, and the plurality of switching means are switching-controlled synchronously with one another. In this case, the switching means can be constructed of a field effect transistor or a bipolar transistor.

According to a third aspect of the present invention, there is provided a storage module according to the first aspect or second aspect, wherein a second winding is incorporated or externally attached which is coupled with the first winding and serves to keep the charging voltage across the entire plurality of storage means in each of a plurality of storage modules at a value according to a predetermined ratio.

According to a fourth aspect of the present invention, there is provided a storage module according to any one of the first to third aspect, further comprising coupling means for mechanically coupling itself with other storage means.

According to a fifth aspect of the present invention, there is provided a storage module according to the fourth aspect, wherein the coupling means serves both mechanical coupling and electric connection.

BRIEF DESCRIPTION OF THE DRAWINGS

FIG. 6A is an appearance view of a storage module 1B1, and FIG. 6B is an appearance view of storage modules 1B1–1B3 in a coupled state.

FIG. 7A is an appearance view of a storage module 1D, and FIG. 7B is an enlarged view of a connecting terminal 28 and a common terminal 29.

DETAILED DESCRIPTION OF THE PRESENT INVENTION

Now, referring to the attached drawings, an explanation will be given of a preferred mode for carrying out a storage means according to the invention.

Figure 1:
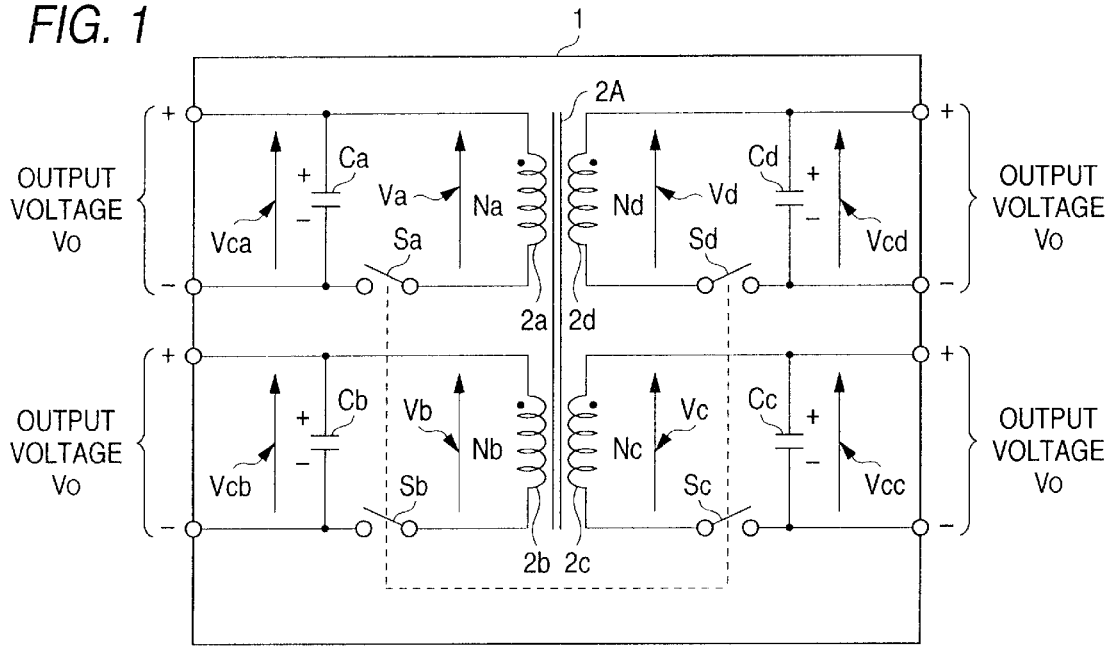
FIG. 1 is a circuit diagram of a storage module 1 for explaining the operating theory of the present invention.

First, referring to FIG. 1, an explanation will be given of the operating theory of the storage module according to the invention.

As seen from FIG. 1, a storage module 1 incorporates four capacitors Ca–Cd serving as storage means (hereinafter referred to as "capacitor C" when they are not distinguished from one another) and is so configured that their stored energy can be transferred among the capacitors Ca–Cd. Specifically, the storage module 1 includes a transformer 2A having windings 2a–2d (hereinafter referred as "winding 2" when they are not distinguished from one another) corresponding to the first winding in the present invention. The transformer 2A serves as an ideal transformer with the respective windings each having 0Ω and no leakage inductance and providing no exited current. The respective windings 2a–2d are magnetically connected to one another through an iron-core, and wound so as to have number of turns of Na, Nb, Nc and Nd, respectively. Further, the storage module 1 also includes switches Sa–Sd (hereinafter referred to as "switch S" when they are not distinguished from one another) which are connected between the winding-terminating side end of each of the windings 2a–2d and the minus-side terminal of each of the capacitors Ca–Cd, respectively and constitute energy transfer means according to the invention as well as the windings 2. In this case, each of the switches Sa–Sd is formed of e.g. FET or a bipolar transistor. They are on/off controlled synchronously with each other by a switching control circuit (not shown) and kept in their closed state when they are switched off.

In the storage module 1, when the switches Sa–Sd are switching-controlled by the switching control circuit, the following equation (1) holds between the voltages Vca–Vcd across the capacitors Ca–Cd and the numbers of turns Na–Nd of the windings 2.

$$Vca:Vcb:Vcc:Vcd = Na:Nb:Nc:Nd \quad (1)$$

Therefore, when the switches Sa—Sa are switched, energy is transferred among the capacitors Ca–Cd. An explanation will be given of an exemplary case where a higher voltage than the voltage defined in Equation (1) is applied across the capacitor Ca. When the switches Sa–Sd are turned on, since only the voltage Vca across the capacitor Ca is higher than the voltage defined in Equation (1), a current flows through a current passage composed of a (+) side terminal of the capacitor Ca, winding 2a, switch Sa and a (−) side terminal of the capacitor Ca. In this case, a voltage Va which is equal to the voltage Vca across the capacitor Ca is generated in the winding 2a. The voltages Vb–Vd corresponding to the ratios to the number of turns Na of the winding 2a are generated in the other windings 2b–2d. More specifically, the voltage Vb with a value (voltage Va×Nb/Na) is generated in the winding 2a, the voltage Vc with a value (voltage Va×Nc/Na) is generated in the winding 2c and the voltage Vd (voltage Va·Nd/Na) is generated in the winding 2d.

In this case, the respective voltages Vb–Vd are higher than the corresponding voltages Vcb–Vcd across the capacitors. Therefore, each of the currents based on the voltages Vb–Vd continues to flow through a current path comprising the winding 2, capacitor C and switch S to charge each of the capacitors Cb–Cd. Subsequently, charging is ceased in sequence from the capacitor where the voltage Vb–Vd and the corresponding Vcb–Vcd reach an equal voltage. Eventually, Equation (1) is satisfied. As a result, dispersion/transfer of energy from the capacitor Ca to the other capacitors Cb–Cd is performed. Incidentally, it should be noted that an output of V0 is supplied to the load (not shown) through the connecting terminals connected to both ends of each of the capacitors Ca–Cd during any period while the switch S is switched on or off.

In accordance with this embodiment, the storage module 1 itself keeps the voltages Vca–Vcd across the incorporated capacitors Ca–Cd at the values having the ratios corresponding to Equation (1). Therefore, unlike the conventional transfer apparatus 21, the storage module 1 makes it unnecessary to effect a troublesome working of connecting the electronic components such as other choke coils one by one. In addition, since the storage module 1 can be constructed of the same number of windings 2 and switches S as the storage means (capacitors C), the number of circuit components can be reduced so that the storage module can be down-sized and made inexpensive. Further, since it is only required that the switches are on/off controlled synchronously with each other, they can be easily controlled and not led to short-circuiting. Thus, the energy transfer among the capacitors Ca–Cd can be carried out reliably and surely.

Figure 2:
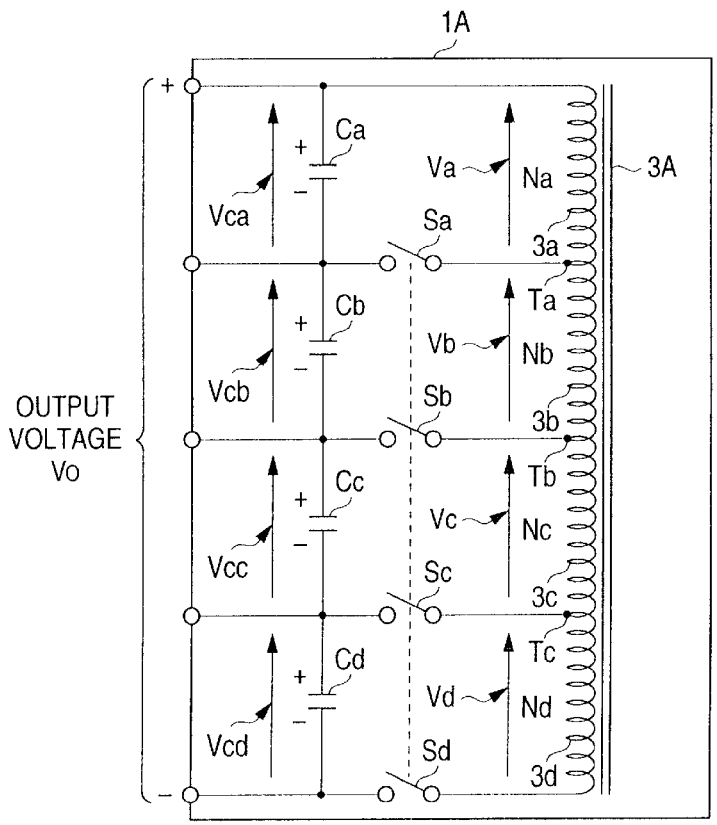
FIG. 2 is a circuit diagram of a storage module 1A for explaining the operating theory of the present invention.

The present invention should not be limited to the configuration of the storage module 1 described above. As seen from FIG. 2, a storage module 1A can be structured by employing a transformer 3A instead of the transformer 2A. In the storage module 1A, no explanation will-be given of the same reference symbols referring to like elements of the storage module 1. In this case, windings 3a–3d (hereinafter referred to as "winding 3" when they are not distinguished from one another) are connected in series with the transformer 3A, and intermediate taps Ta–Tc (hereinafter referred to as "intermediate tap T" when they are not distinguished from one another) are connected to junction points between the adjacent windings 3, respectively. The respective windings 3a–3d are magnetically coupled with one another through an iron-core, and wound so as to have number of turns of Na, Nb, Nc and Nd, respectively. Incidentally, it should be noted that the transformer 3A also serves as an ideal transformer with the respective windings each having 0Ω and no leakage inductance and providing no exited current.

As for the switches Sa–Sc, their one ends are connected to the intermediate taps Ta–Tc of the transformer 3A, respectively, whereas the their other ends are connected to the junction points between the capacitors C, respectively. As for the switch Sd, its one end is connected to the winding-terminating side end of each of the winding 3a whereas its other end is connected to the minus-side terminal of the capacitor Cd which is a ground potential at an output voltage of VO.

In the storage module 1A also, when the switches Sa–Sd are switched, the dispersion/transfer of energy is carried out so that the above Equation (1) holds among the voltages Vca–Vcd across the capacitors Ca–Cd. Therefore, if the windings 3 are wound to have the same number of turns, the Vca–Vcd across the capacitors C can be made equal. In this case, in this storage module, the voltage (e.g. Vca, Vcb, Vcc or Vcd) across each of the capacitors Ca–Cd can be produced as an output voltage VO from the connecting terminals connected to its both ends. Otherwise, the voltage (Vca+Vcb+Vcc) across a plurality of the capacitors (e.g. Ca, Cb and Cc) which are successively adjacent to each other can be produced as an output voltage of VO from the connecting terminals connected to their both ends. The operating theory, which is the same as the storage module 1, will not be explained here in detail.

Now referring to FIG. 3, an explanation will be given of a practical circuit configuration using an actual transformer. In the following explanation, like reference symbols, which refer to like elements in the storage modules 1 and 1A, will not explained. The same operation as that for the storage modules 1 and 1A will not be also explained.

Figure 3:
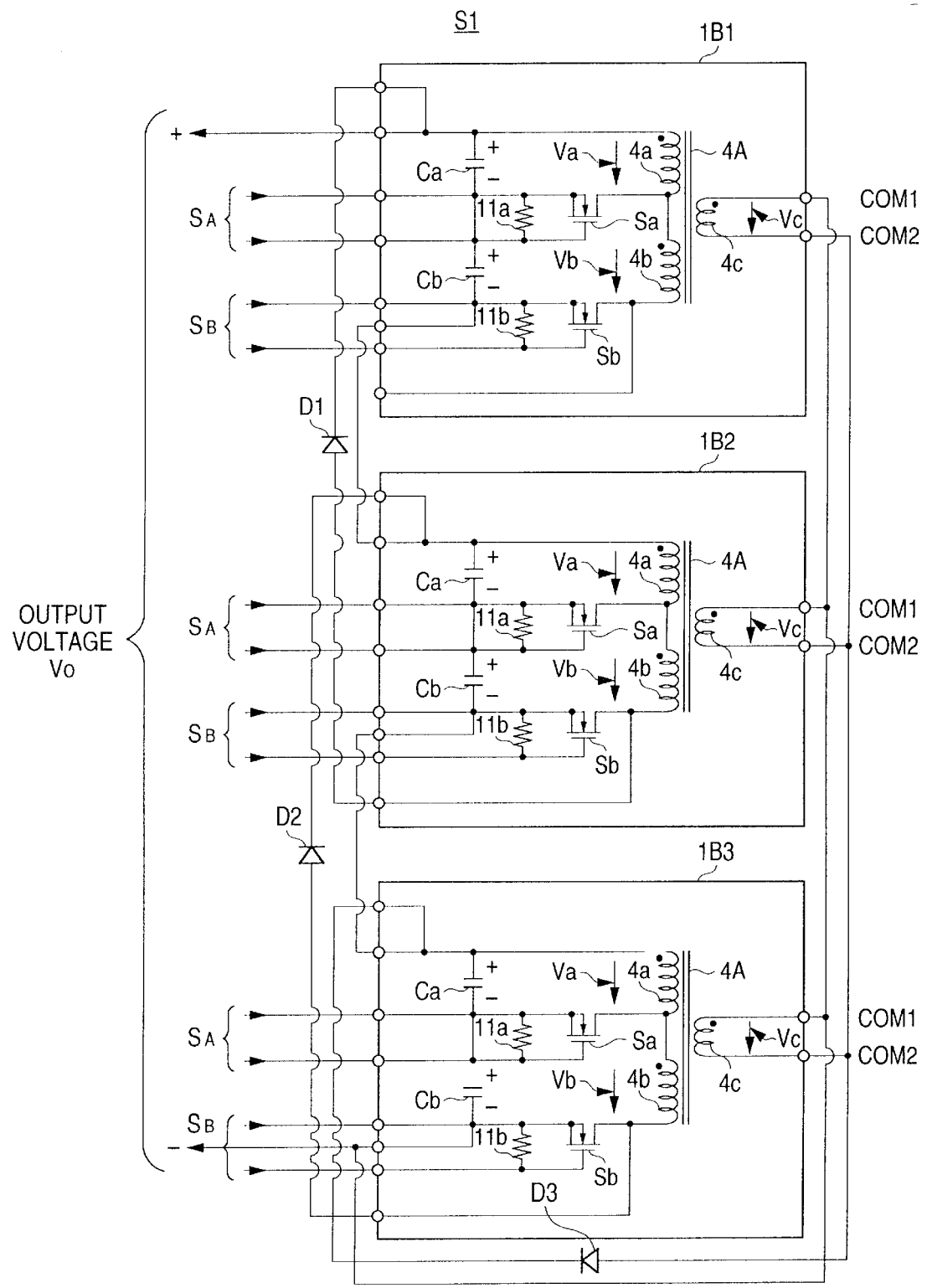
FIG. 3 is a circuit diagram of a storage system S1 according to an embodiment of the invention.

In FIG. 3, a storage system S1 is constructed of a plurality of storage modules 1B1–1B3 (hereinafter referred to as "storage module 1B" when they are not distinguished from one another) which are connected in series and have the same configuration. In this case, the storage module 1B includes capacitors Ca and Cb connected in series, a transformer 4A, switches Sa and Sb each constructed of an FET, and resistors 11a and 11b. Specifically, the transformer 4A includes windings 4a and 4b having the same number of turns which serve as energy transfer means, and a common winding 4c having the number of turns twice as many as that of the winding 4a. Incidentally, the common winding 4c corresponds to the second winding in the present invention and is magnetically coupled with the windings 4a and 4b of the transformer 4A of the other storage modules 1B in such a manner that it is connected in parallel to the common winding 4c of the other storage module 1B outside the system. Further, the common winding 4c, which transfers energy among the storage modules 1B from one another through itself, has the function of keeping the voltage (Vca+Vcb) across the series circuit of the capacitors Ca and Cb, in each of all the storage modules 1B connected in parallel, at the voltage (the same voltage because of the same number of turns in this embodiment) corresponding to the number of turns of the common winding itself.

In the storage system S1, an external oscillator for creating driving signals SA and SB which are synchronous with each other is connected to connecting terminals for the switches Sa and Sb of each of the storage modules 1B. Further, the COM 1 terminals and COM 2 terminals connected to the common windings 4c in the respective capacitor modules 1B are connected to one another, respectively. The output terminals of an output voltage VO are connected in series so that the capacitors Ca and Cb in each of the storage modules 1B are connected in series. A diode D1 is connected between the connecting terminal connected to the winding-terminating side terminal of the winding 4b of the storage module 1B2 and that connected to the winding-starting side terminal of the winding 4a of the storage module 1B1; a diode D2 is connected between the connecting terminal connected to the winding-terminating side terminal of the winding 4b of the storage module 1B3 and that connected to the winding-starting side terminal of the winding 4a of the storage module 1B2; and a diode D3 is connected between the connecting terminal connected to the COM 2 terminal and the connecting terminal connected to the winding-starting side terminal of the winding 4a of the storage module 1B3.

In this configuration, when the driving signals SA and SB are supplied to each storage module 1B from the external oscillator, each switch S starts switching in each storage module 1B. Thus, dispersion/transfer of energy is carried out among the storage modules 1B. In this case, since the common windings 4c with the same number of turns are connected in parallel, the voltages Va and Vb induced in the windings 4a and 4b of each transformer 4A are equal. As a result, the voltage (Vca–Vcb) across the capacitors Ca and Cb in each storage module 1B is kept at the same value.

On the other hand, the actual transformer 4A in which an excited current flows is magnetized when the switch S is turned on. Therefore, when the switches Sa and Sb are turned off, as seen from FIG. 3, on the basis of the excited energy of the transformer 4A, the voltages Va, Vb and Vc corresponding to the numbers of turns are generated in the windings 4a, 4b and 4c. Then, since the switches S are in their off state, the currents based on the voltages Va and Vb generated in the windings 4a and 4b of the storage module 1B2 flow through a passage composed of the winding-terminating side terminal of the winding 4b, diode D1, capacitors Ca and Cb of the storage module 1B1 and winding-starting side terminal of the winding 4a of the storage module 1B2 and charge the capacitors Ca and Cb of the storage module 1B1.

Likewise, the currents based on the voltages Va and Vb generated in the windings 4a and 4b of the storage module 1B3 flow through a passage composed of the winding-terminating side terminal of the winding 4b, diode D2, capacitors Ca and Cb of the storage module 1B2 and winding-starting side terminal of the winding 4a of the storage module 1B3 and charge the capacitors Ca and Cb of the storage module 1B2. The current based on the voltage Vc generated in the winding 4c flows through a passage composed of the winding-terminating side terminal of the winding 4c, diode D3, capacitors Ca and Cb of the storage module 1B3 and winding-starting side terminal of the winding 4c and charges the capacitors Ca and Cb of the storage module 1B3. In this case, the excited energy of the transformer 4A is discharged in the order of a larger voltage difference across the capacitors Ca and Cb of the storage module 1B for the voltages Va, Vb and Vc. Thus, when the switches Sa and Sb are in their off state, the transformer 4A is magnetically reset, and the voltage across the capacitors Ca and Cb in each storage module 1B is averaged by the current based on the excited energy of the transformer 4A.

Figure 4:
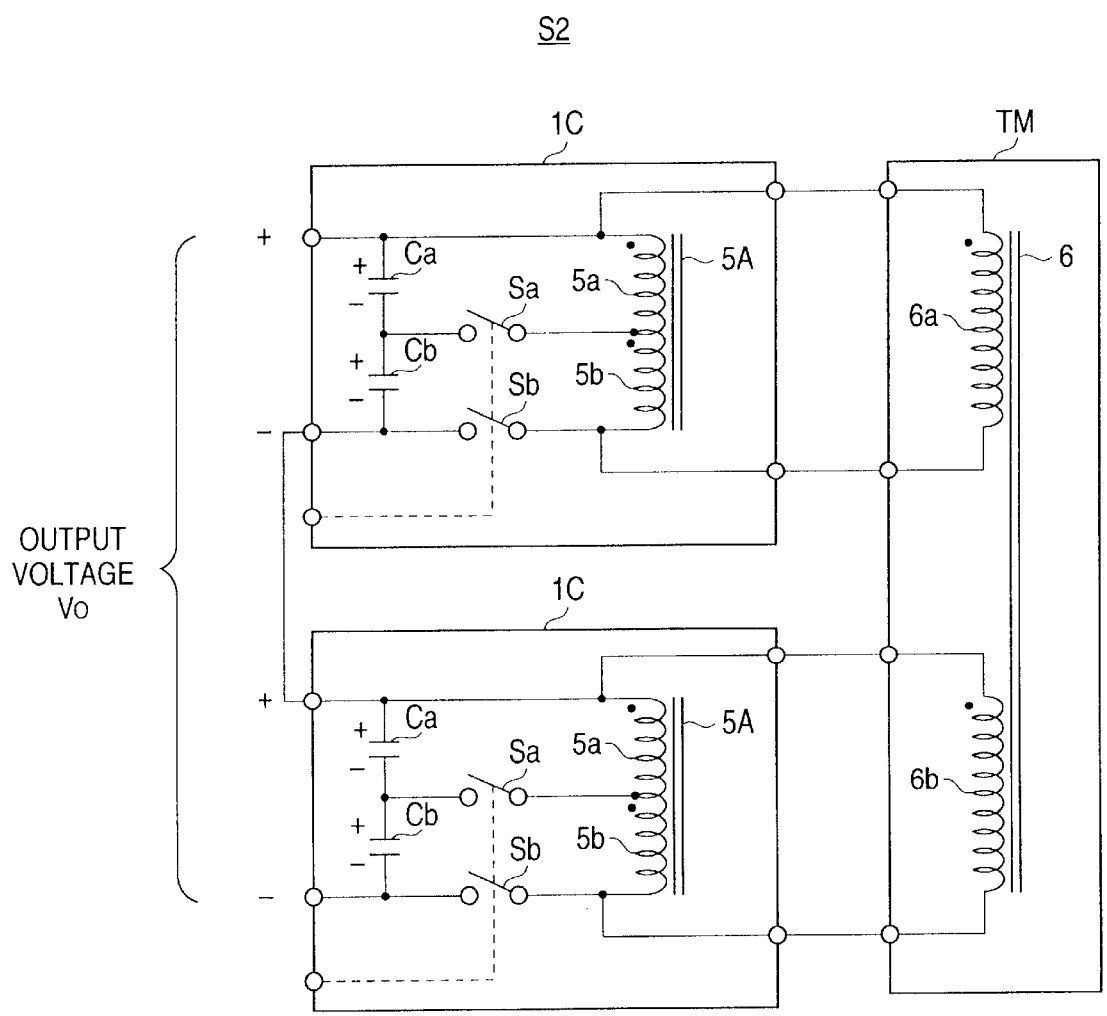
FIG. 4 is a circuit diagram of a storage system S2 according to another embodiment of the invention.

The common winding 4c in the storage module 1B may be arranged outside the storage module. A storage system S2 shown in FIG. 4 includes a plurality of storage modules 1C (two thereof are illustrated in FIG. 4) each having a transformer 5A with windings 5a and 5b wound and a transformer 6 with common windings 6a and 6b wound correspondingly to the number of the storage modules 1C. The storage system S2 removes necessity of winging the common winding around the transformer 5A housed in the storage module 1C so that the transformer 5A and by extension the storage module can be down-sized and the transformer can be manufactured at low cost.

Figure 5:
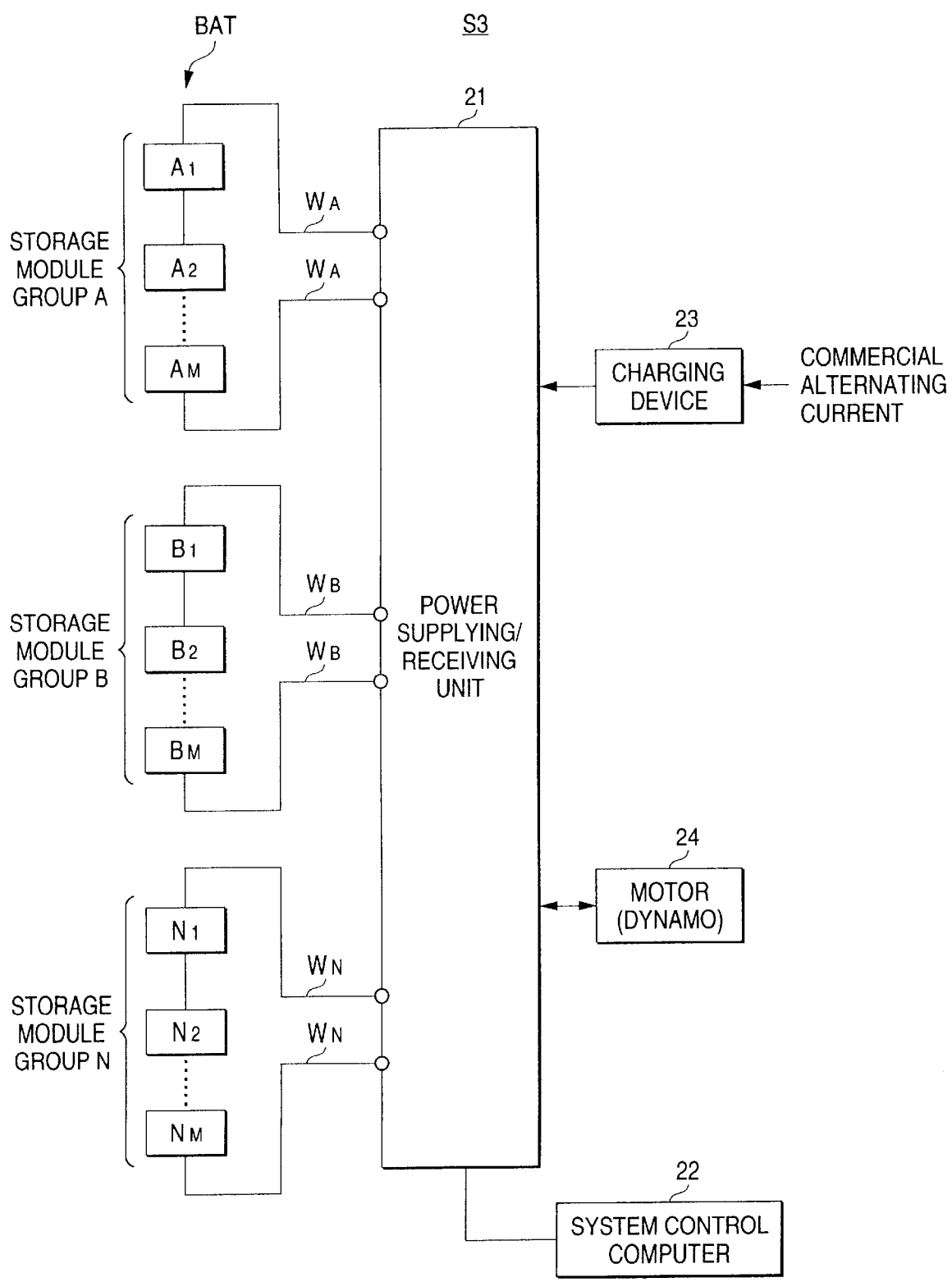
FIG. 5 is an arrangement view of a power supplying/receiving system S3 indicative of a typical use of the invention.
Figure 8:
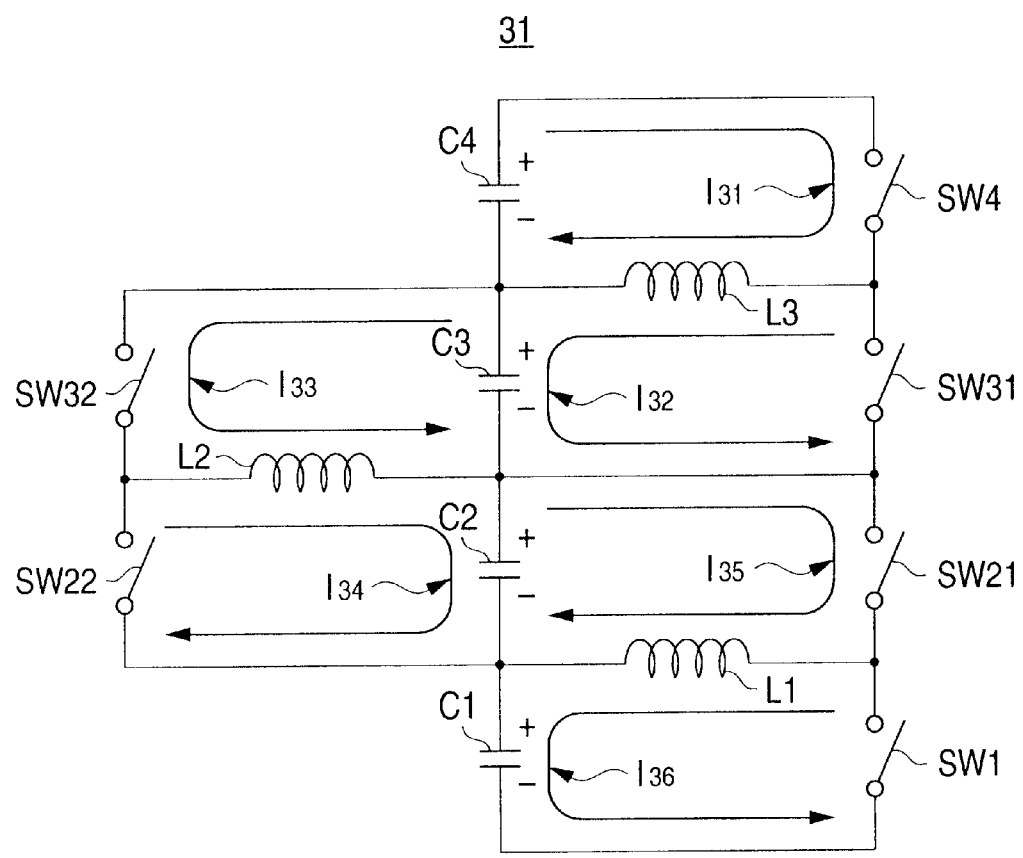
FIG. 8 is a circuit diagram of a conventional transfer apparatus 31.

Referring to FIG. 5, an explanation will be given of uses of the storage module.

FIG. 5 shows a power supplying/receiving system S3 in a motor vehicle. The power supplying/receiving system S3 includes a battery BAT, which is composed of N-number of storage module groups from a storage module group A having a plurality of storage modules A1–AM to a storage module group N having a plurality of storage modules N1–NM, a power supplying/receiving control unit 21, a system control computer 22, a charging device 23, a driving motor 24 and connecting cables WA–WN connecting the storage module groups A–N to the power supplying/receiving unit 21. Each of the storage modules A1–NM are constructed to have the same configuration as the storage module 1B. The connecting relationship among the storage modules A1–NM are not shown.

In the power supplying/receiving system S3, the system control computer 22 detects the operation of an accelerator and a brake of an electric vehicle and a vehicle speed and controls the power supply/receipt of the power supplying/receiving unit 21. Concretely, under the control by the system control computer 22, the power supplying/receiving unit 21 supplies, during driving, the output voltages from the storage modules A–N to a motor 24, and supplies, during braking or downhill moving, the electric power produced from the motor 24 which serves as a generator to the storage modules A–N. When the output voltage from the battery BAT lowers, the power supplying/receiving unit 21 receives the charging voltage rectified from an commercial AC voltage by a charging device 23 separated from the electric vehicle and supplies it to the battery BAT. In these cases, the connecting cables WA–WN are fabricated to have equal wiring resistances so that the charging amounts and discharging amounts for the storage module groups A–N are equal to one another. Thus, the storage module groups A–N always keep the output voltages approximately equal.

Additionally, in the power supplying/receiving system S3, for example, when the battery BAT is in a full-charged state, the power supplying/receiving control unit 21 supplies the voltage across the storage modules A–N connected in series to the motor 24. When the charging amount of the battery BAT is lowered, the power supplying/receiving control unit 21 supplies the voltage across any plurality of storage module groups A–N connected in parallel to the motor 24. In other words, according to the remaining level of the battery BAT, the power supplying/receiving control unit 21 supplies, to the motor 24, the output voltage across the storage module groups connected in series or in parallel. In this case, in each of the storage modules A1–MN, stored energy can be charged/discharged most effectively by automatically averaging the voltage across the capacitor C internally arranged.

Referring to FIGS. 6A–6B and 7A–7B, an explanation will be given of the structure of the storage module 1.

As seen from FIGS. 6A and 6B, each of storage modules 1B1–1BN (three thereof are illustrated in FIG. 6B) is composed of a module body 21, covers 22 and 23, and connector portions 24 and 25. The plurality of storage modules 1B can be adapted so that they are coupled with each other. When they are not coupled, an accident of short-circuiting of the connector portions 24 and 25 is prevented in such a way that the groove of the cover 22 is fit over the projection (coupling means in the present invention) 26 of the module body 22 and the cover 23 is fit in the groove (coupling means in the present invention) of the module body 21. On the other hand, when the plurality of storage modules are coupled, after the covers 22 and 23 are removed, the projection 26 and groove 27 of the storage module 1B are fit to each other. Thus, the plurality of storage modules 1B1–1BN are coupled. In this case, in the connector portion 25, the metallic connecting terminals such as the connecting terminal of the output voltage V0, COM 1 terminal and COM 2 terminal are protruded in a state urged in an direction of arrow A. These metallic connecting terminals are brought into face-contact with the metallic terminals in the connector portion 24 to assure electrical contact therebetween. In this way, since the storage modules 1B can be easily coupled, the storage system can be easily constructed in a high voltage output type with the capacitors C connected in series within a plurality of storage modules 1B, or in a large capacity output type with the capacitors C connected in parallel therein.

As seen from FIGS. 7A and 7B, the coupling means according to the invention can be constructed in a type serving both mechanical coupling and electric connection. Each of the storage modules 1D is equipped with rivet-shaped metallic connecting terminals 28, 28, . . . In this case, the connecting terminals 28 and 28, and common terminals 29 are coupled mechanically and electrically in such a manner that the connecting terminals 28 are fit in the holes made in the common terminals 29 of a metallic plate. In such a configuration, since the plurality of storage means 1D can be coupled mechanically and electrically by simple coupling means, cost for the coupling means can be suppressed and cost for connecting work can be reduced.

The present invention should not be limited to the embodiments described above, but may be modified suitably. For example, in the embodiment described above, although the storage modules 1B were connected in series as shown in FIG. 3, they may be connected in parallel. Further, the coupling means in the present invention should not be limited to that shown in FIGS. 6 and 7, but may be any arrangement such as provision of the coupling means for both series connection and parallel connection. The storage module should not be limited to the use of a battery for a motor vehicle, but may be applied to several kinds of power supplying/receiving system.

In the embodiment described above, the storage means was explained as an electric double-layer capacitor, but may be various kinds of large-capacitance capacitors and various kinds of secondary batteries. In this case, the storage means may be a composite means of a capacitor and a secondary battery.

As understood from the description hitherto made, in accordance with the storage module according to the first aspect, provision of energy transfer means permits the storage module itself to keep the output voltage from each incorporated storage means at the value corresponding to a predetermined ratio without making troublesome connecting work of connecting another electric component such as a choke coil. Thus, a battery of the type can be provided which is suited to the voltage or capacity required for several kinds of power supplying/receiving system such as a battery for a motor vehicle.

In accordance with the storage module defined in the second aspect, since energy transfer can be made among a plurality of storage means in such a manner that a plurality of switching means are switch-controlled synchronously, the control can be made executed very easily. Such a control does not lead to short-circuiting so that energy stored in the storage means can be transferred very reliably and surely. Since the storage module can be constructed of the same number of windings and switches as that of the storage means, the number of circuit components can be reduced so that the storage module can be down-sized and made inexpensive.

In accordance with the storage means according to the third aspect, it is structured so that the second winding can be incorporated or attached externally, the charging voltage across the entire plurality of storage means in each of the plurality of storage modules can be kept at a voltage corresponding to a predetermined ratio surely and easily.

In accordance with the storage module defined in the fourth aspect, since the coupling means is provided for mechanically coupling the storage means, the work of connecting the storage modules in series or in parallel can be easily carried out.

In accordance with the storage means defined in the fifth aspect, since the coupling means serves both mechanical connection and electrical connection, cost for the coupling means can be suppressed and cost for connecting work can be reduced.

What is claimed is:

1. A storage module comprising:

a plurality of storage means for storing electric energy;

energy transfer means for transferring the electric energy among the plurality of storage means to keep a charging voltage across each of the storage means at a value according to a predetermined ratio;

coupling means for mechanically coupling to another storage module that has the same configuration as the storage module; and a connection terminal to which a drive signal is input, wherein the energy transfer means includes a plurality of series circuits each having at least a first winding and switching means connected in series, each of the plurality of series circuits is adapted to be connectable in parallel to each of the plurality of storage means, the plurality of first windings are magnetically coupled with one another, and the plurality of switching means are switching-controlled synchronously with one another, and wherein the drive signal switches the switching means of the storage module and the switching means of the another storage module synchronously with one another.

2. The storage module according to claim 1, wherein a second winding is incorporated or externally attached, is coupled with the first winding and serves to keep the charging voltage across the entire plurality of storage means in each of a plurality of storage modules at the value according to the predetermined ratio.

3. The storage module according to claim 1, wherein the coupling means serves both mechanical coupling and electric connection. comprising coupling means for mechanically coupling one of the plurality of storage means with another.

4. The storage module according to claim 1, wherein the coupling means comprises:

a fitting projection portion and a fitting groove portion, which are formed on a module main body containing the storage means and the energy transfer means; and connector portions formed on the fitting projection portion and the fitting groove portion, respectively, wherein when the fitting projection portion of the storage module is fitted to the fitting groove portion of the another storage module, wall surfaces of the module main bodies of the both storage modules on which the fitting projection portions and the fitting groove portions are formed, respectively, are closely contacted with each other and the connector portions of the both storage modules are electrically connected.

5. The storage module according to claim 4, wherein the fitting projection portion and the fitting groove portion are adapted to be fitted covers for preventing short circuiting when the storage module is not coupled to other storage modules.

6. A power supplying/receiving system for a vehicle comprising:

a system control computer;

a plurality of storage module groups each including a plurality of storage means for storing electric energy, the plurality of storage means electrically connected in each of the plurality of storage module groups, the plurality of storage module groups each including energy transfer means for transferring the electric energy among the plurality of storage means to keep a charging voltage across each of the storage means at a value according to a predetermined ratio, the plurality of storage module groups each including coupling means for coupling the storage module group to another storage module group mechanically, the plurality of storage module groups each including a connection terminal to which a drive signal is input;

a supplying/receiving control section for receiving an order from the system computer and controlling voltages among the plurality of storage module groups on the basis of the order from the system control computer, the supplying/receiving control section for supplying the electric energy to a load;

a charger for supplying the electric energy to the supplying/receiving control section, wherein the energy transfer means includes a plurality of series circuits each having at least a first winding and switching means connected in series, each of the plurality of series circuits is adapted to be connectable in parallel to each of the plurality of storage means, the plurality of first windings are magnetically coupled with one another, and the plurality of switching means are switching-controlled synchronously with one another, and wherein the drive signal switches the switching means of the storage module groups synchronously with one another.

* * * * *